United States Patent
Agrawal et al.

(10) Patent No.: US 7,406,478 B2
(45) Date of Patent: Jul. 29, 2008

(54) FLEXIBLE HANDLING OF DATETIME XML DATATYPE IN A DATABASE SYSTEM

(75) Inventors: Abhyudaya Agrawal, San Francisco, CA (US); Ravi Murthy, Fremont, CA (US); Sivasankaran Chandrasekar, Palo Alto, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 334 days.

(21) Appl. No.: 11/202,463

(22) Filed: Aug. 11, 2005

(65) Prior Publication Data
US 2007/0038649 A1    Feb. 15, 2007

(51) Int. Cl.
*G06F 17/00*    (2006.01)
(52) U.S. Cl. .................. 707/102; 707/100; 707/101
(58) Field of Classification Search .................. None
See application file for complete search history.

(56) References Cited

U.S. PATENT DOCUMENTS

| | | | |
|---|---|---|---|
| 5,295,261 A | 3/1994 | Simmonetti | |
| 5,404,513 A | 4/1995 | Powers et al. | |
| 5,467,471 A | 11/1995 | Bader | |
| 5,680,614 A | 10/1997 | Bakuya et al. | |
| 5,724,577 A | 3/1998 | Exley et al. | |
| 5,734,887 A | 3/1998 | Kingberg et al. | |
| 5,878,415 A | 3/1999 | Olds | |
| 5,974,407 A | 10/1999 | Sacks | |
| 5,987,506 A | 11/1999 | Carter et al. | |
| 5,999,941 A | 12/1999 | Andersen | |
| 6,012,067 A | 1/2000 | Sarkar | |
| 6,038,563 A | 3/2000 | Bapat et al. | |

(Continued)

FOREIGN PATENT DOCUMENTS

EP    1 241 589 A2    9/2002

(Continued)

OTHER PUBLICATIONS

Chen, Ruey-Shun et al., "Developing an XML framework for metadata system", Trinity College Dublin, Proc. of the 1st Inter. Sympo. on Information and Communication, pp. 267-272.

(Continued)

*Primary Examiner*—Sana Al-Hashemi
(74) *Attorney, Agent, or Firm*—Hickman Palermo Truong & Becker LLP

(57) ABSTRACT

A database server registers an XML schema and determines a database representation for the XML schema and mapping information, determining what database types should be used to represent an XML schema and/or how instances of the XML schema are stored by a database system. The mapping information indicates the mapping between the constructs declared in the XML schema and the constructs included in the appropriate database representation. The XML schema may contain annotations that describe one or more properties of a database representation of an XML date-time type. Based on the annotations, the database determines an appropriate database representation and generates mapping information mapping the declaration of the XML date-time type of the XML schema to the constructs of the database representation.

20 Claims, 2 Drawing Sheets

U.S. PATENT DOCUMENTS

| | | | |
|---|---|---|---|
| 6,055,544 | A | 4/2000 | DeRose et al. |
| 6,061,684 | A | 5/2000 | Glasser et al. |
| 6,128,610 | A | 10/2000 | Srinivasan et al. |
| 6,141,655 | A | 10/2000 | Johnson et al. |
| 6,154,741 | A | 11/2000 | Feldman |
| 6,199,195 | B1 | 3/2001 | Goodwin et al. |
| 6,208,993 | B1 | 3/2001 | Shadmone |
| 6,236,988 | B1 | 5/2001 | Aldred |
| 6,240,407 | B1 | 5/2001 | Chang et al. |
| 6,263,332 | B1 | 7/2001 | Nasr et al. |
| 6,269,380 | B1 | 7/2001 | Terry et al. |
| 6,279,006 | B1 | 8/2001 | Shigemi et al. |
| 6,279,007 | B1 | 8/2001 | Uppala |
| 6,298,349 | B1 | 10/2001 | Toyoshima et al. |
| 6,343,287 | B1 | 1/2002 | Kumar et al. |
| 6,356,920 | B1 | 3/2002 | Vandersluis |
| 6,366,934 | B1 | 4/2002 | Cheng et al. |
| 6,370,537 | B1 | 4/2002 | Gilbert et al. |
| 6,418,448 | B1 | 7/2002 | Sarkar |
| 6,438,540 | B2 | 8/2002 | Nasr et al. |
| 6,449,620 | B1 | 9/2002 | Draper et al. |
| 6,470,344 | B1 | 10/2002 | Kothuri et al. |
| 6,487,546 | B1 | 11/2002 | Witkowski |
| 6,496,842 | B1 | 12/2002 | Lyness |
| 6,571,231 | B2 | 5/2003 | Sedlar |
| 6,574,655 | B1 | 6/2003 | Libert et al. |
| 6,584,459 | B1 | 6/2003 | Chang et al. |
| 6,604,100 | B1 | 8/2003 | Fernandez et al. |
| 6,636,845 | B2 | 10/2003 | Chau et al. |
| 6,643,633 | B2 | 11/2003 | Chau et al. |
| 6,718,322 | B1 | 4/2004 | Brye |
| 6,721,727 | B2 | 4/2004 | Chau et al. |
| 6,725,212 | B2 | 4/2004 | Couch et al. |
| 6,754,661 | B1 | 6/2004 | Hallin et al. |
| 6,772,350 | B1 | 8/2004 | Belani et al. |
| 6,785,673 | B1 | 8/2004 | Fernandez et al. |
| 6,826,727 | B1 | 11/2004 | Mohr et al. |
| 6,836,778 | B2 | 12/2004 | Manikutty et al. |
| 6,836,857 | B2 | 12/2004 | Ten-Hove et al. |
| 6,871,204 | B2 | 3/2005 | Krishnaprasad et al. |
| 7,031,956 | B1 | 4/2006 | Lee et al. |
| 2002/0015042 | A1 | 2/2002 | Robotham et al. |
| 2002/0035606 | A1 | 3/2002 | Kenton |
| 2002/0038358 | A1 | 3/2002 | Sweatt, III et al. |
| 2002/0056025 | A1 | 5/2002 | Qui et al. |
| 2002/0073019 | A1 | 6/2002 | Deaton |
| 2002/0087510 | A1 | 7/2002 | Weinberg et al. |
| 2002/0116371 | A1 | 8/2002 | Dodds et al. |
| 2002/0116457 | A1 | 8/2002 | Eshleman et al. |
| 2002/0120685 | A1 | 8/2002 | Srivastava et al. |
| 2002/0123993 | A1 | 9/2002 | Chau et al. |
| 2002/0124100 | A1 | 9/2002 | Adams |
| 2002/0133484 | A1 | 9/2002 | Chau et al. |
| 2002/0143512 | A1 | 10/2002 | Shamoto et al. |
| 2002/0156772 | A1 | 10/2002 | Chau et al. |
| 2002/0156811 | A1 | 10/2002 | Krupta |
| 2002/0169788 | A1 | 11/2002 | Lee et al. |
| 2002/0184188 | A1 | 12/2002 | Mandyam et al. |
| 2002/0184401 | A1 | 12/2002 | Kadel, Jr. et al. |
| 2002/0198874 | A1 | 12/2002 | Nasr et al. |
| 2003/0004937 | A1 | 1/2003 | Salmenkaita et al. |
| 2003/0009361 | A1 | 1/2003 | Hancock et al. |
| 2003/0014397 | A1 | 1/2003 | Chau et al. |
| 2003/0033285 | A1 | 2/2003 | Jalali et al. |
| 2003/0065659 | A1 | 4/2003 | Agarwal et al. |
| 2003/0093672 | A1 | 5/2003 | Cichowlas |
| 2003/0101194 | A1 | 5/2003 | Rys et al. |
| 2003/0131073 | A1* | 7/2003 | Lucovsky et al. ............ 709/219 |
| 2003/0140308 | A1* | 7/2003 | Murthy et al. ............... 715/500 |
| 2003/0154204 | A1 | 8/2003 | Chen-Wright et al. |
| 2003/0158897 | A1 | 8/2003 | Ben-Natan et al. |
| 2003/0172135 | A1 | 9/2003 | Bobick et al. |
| 2003/0182624 | A1 | 9/2003 | Large |
| 2003/0204481 | A1* | 10/2003 | Lau ............................... 707/1 |
| 2004/0043758 | A1 | 3/2004 | Sorvari et al. |
| 2004/0064466 | A1 | 4/2004 | Manikutty et al. |
| 2004/0148278 | A1 | 7/2004 | Milo et al. |
| 2004/0176958 | A1 | 9/2004 | Salmenkaita et al. |
| 2004/0220912 | A1 | 11/2004 | Manikutty et al. |
| 2004/0220927 | A1 | 11/2004 | Murthy et al. |
| 2004/0225680 | A1 | 11/2004 | Cameron et al. |
| 2004/0267760 | A1 | 12/2004 | Brundage et al. |
| 2005/0010896 | A1 | 1/2005 | Meliksetian et al. |
| 2005/0050058 | A1 | 3/2005 | Jain et al. |
| 2005/0050092 | A1 | 3/2005 | Jain et al. |
| 2005/0144556 | A1* | 6/2005 | Petersen et al. ............. 715/513 |
| 2005/0289125 | A1 | 12/2005 | Liu et al. |
| 2006/0031233 | A1 | 2/2006 | Liu et al. |

FOREIGN PATENT DOCUMENTS

| | | |
|---|---|---|
| WO | WO 00/49533 | 8/2000 |
| WO | WO 01/42881 A2 | 6/2001 |
| WO | WO 01/59602 A1 | 8/2001 |
| WO | WO 01/61566 A1 | 8/2001 |

OTHER PUBLICATIONS

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Josephine Cheng, et al., "IBM DB2 XML Extender, An end-to-end solution for storing and retrieving XML documents.," IEEE, ICDE '00 Conference, San Diego, Feb. 2000, 128 pages.

R. Bourret et al.: A Generic Load/Extract Utility for Data Transfer Between XML Documnts and Relational Databases, Jun. 8-9, 2000, IEEE Computing SOC., pp. 134-143.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Daniele Braga et al., "A Graphical Environment to Query XML Data with Query," Proceedings of the Fourth International Conference on Web Information Systems Engineering (WISE '03), 2003, IEEE, 10 pages.

International Preliminary Examination Report, Application No. PCT/US02/30783, pp. 1-14.

J. Shanmugasundaram, et al. "Querying XML Views of Relational Data," Proceedings of the 27th Very Large Databases Conference, Rome, Italy, Sep. 2001, pp. 261-270.

Current claims in PCT/US02/30783, pp. 1-8.

Schmidt et al.—"Efficient Relational Storage and Retrieval of XML Documents"—CWI, The Netherlands (pp. 1-6).

"ORACLE 9i Project XDB"—The XML Database—ORACLE—2001, (pp. 1-18).

"Oracle8i—The XML Enabled Data Mangement System"—Oracle Corporation: Sandeepan Banerjee, Vishu Krishnamurthy, Muralidar Krishnaprasad and Ravi Murthy—Mar. 2000 IEEE pp. 561-568.

Lawrence et al. "Integrating Relational Database Schemas Using a Standardized Dictionary"—2001—ACM (pp. 225-230).

"A Performance Evaluation of Storing XML Data in Relational Database Management Systems,"—Latifur Khan and Yan Rao -ACM-2001 (pp. 31-38).

"From XML Schema to Relations: A Cost-Based Approach to XML Storage"—Bell Laboratories: Philip Bohannon, Juliana Freire, Prasan Roy and Jerome Simeon—IEEE—2002—Proceedings of the 18th International Conference on Data Engineering (ICDE'02), 12 pages.

"SRQL: Sorted Relational Query Language"—Raghu Ramakrishnan, Donko Donjerkovic, Arvind Ranganathan, Kevin S. Beyer and Muralidar Krishnaprasad—Jul. 1-3, 1998 IEEE pp. 84-95.

Daniela Florescu et al., "A Performance Evaluation of Alternative Mapping Schemes of Storing XML Data in a Relational Database," May 1999, XP-002168318, pp. 1-31.

International Preliminary Examination Report, Application No. PCT/US03/35551, pp. 1-17.

Written Opinion, Application No. PCT/US03/35551.

Current claims in PCT/US03/35551, pp. 1-4.

Melton, John, "ISO-ANSI Working Draft, XML-Related Specifications (SQL/XML)," WG3: DRS-020, H2-2002-365, Aug. 2002, 154 pages.

Oracle Corporation, "Oracle9i XML Database Developer's Guide—Oracle XML DB," Release 2 (9.2), Mar. 2002, Part No. A96620-1, pp. 4-31-4-35, 5-21-5-24 and 5-70-5-71.

W3C, "XML Schema Part 1: Structures," W3C Recommendation, May 2, 2001, <http://www.w3.org/TR/2001/REC-xmlschema-1-20010502/>, pp. 1-203.

W3C, "XML Schema Part 2: Datatypes," W3C Recommendation, May 2, 2001, <http://www.w3.org/TR/2001/REC-xmlschema-2-20010502/>, pp. 1-146.

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Web Data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

Peng, Feng et al., "XPath queries on streaming data", 2003, ACM Press, pp. 431-442.

Vion-Dury, Jean-Yves, "XPath on left and right sides of rules: toward compact XML tree rewriting through node patterns", 2003, ACM Press, pp. 19-25.

* cited by examiner

FLEXIBLE HANDLING OF DATETIME XML DATATYPE IN A DATABASE SYSTEM

FIELD OF THE INVENTION

The present invention relates to representing XML data in a database, and in particular, to representing XML data types related to date and/or times.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is the standard for data and documents that is finding wide acceptance in the computer industry. XML describes and provides structure to a body of data, such as a file or data packet. The XML standard provides for tags that delimit sections of XML documents referred to as XML elements.

Information about the structure of specific types of XML documents may be specified in documents referred to as "XML schemas". For example, the XML schema for a particular type of XML document may specify the names for the elements contained in that type of XML document, the hierarchical relationship between the elements contained in that type of XML document, and the type of values contained in that particular type of XML document. Standards governing XML schemas include XML Schema, Part 0, Part 1, Part 2, W3C Recommendation, 2 May 2001, the contents of which are incorporated herein by reference, XML Schema Part 1: Structures, Second Edition, W3C Recommendation 28 October. 2004, the contents of which are incorporated herein by reference, and XML Schema Part 2: Datatypes Second Edition, W3C Recommendation 28 October 28, 2004, the contents of which incorporated herein by reference.

XML Storage Mechanisms

Various types of storage mechanisms are used to store an XML document. One type of storage mechanism stores an XML document as a text file in a file system.

Another type of storage mechanism uses object-relational database systems that are enhanced to store and process queries for collections of XML documents. Furthermore, these object-relational database systems can store and manage XML documents as instances of XML schemas. To store and manage the XML documents in a database system, database representations, defined in terms of database data types handled by the database system, are used to represent XML documents.

For example, a database representation of an entire XML document may be a CLOB (binary large object), or maybe one or more tables whose columns store the components of an XML document in one or more rows. A database representation may be a hierarchy of objects in an object-relational database; each object is an instance of an object class and stores one or more elements of an XML document. The object class defines, for example, the structure corresponding to an element, and includes references or pointers to objects representing the immediate descendants of the element.

XML Date-Time Types

XML standards define data types, referred to herein as XML data types. Among these data types are primitive data types for representing dates and/or times, referred to herein as XML date-time types. Examples of XML date-time types include the XML primitive data types "dateTime", "date", "time", and "gYearMonth". XML standards are very flexible and permit instance values to have optional properties. For example, XML standards permit the 'dateTime' type instance to have an arbitrary level of precision, or to have a time Zone property, i.e. to be "with time-zone".

In a database system, database types such as American National Standards Institute ("ANSI") SQL types DATE, TIMESTAMP, and TIMESTAMP WITH TIMEZONE are used as a database representation of an XML date-time type. Database types for date and/or time values are referred to herein database date-time types. The present invention is not limited to any data type of any particular standard for database languages.

For database date-time types, optional properties may be declared. For example, TIMESTAMP(5) declares a timestamp with a level of precision of 5 (i.e. seconds to five decimal places).

Database date-time types are used for database representations of XML date-time types. When using a database date-time type as a database representation of a XML date-time type, a decision is made as to what extent the full range of options of the XML date-time type is to be supported by a database date-time type. The decision needs to strike a balance between supporting a wider range of options and using more database system resources to support the range of options. For example, the time zone property of the XML dateTime type may be supported by the TIMESTAMP WITH TIME ZONE database type. However, this database type requires more storage space than other alternatives, such as TIMESTAMP. If XML documents stored in a database system do not include dataTime instances with time zone, then database system resources are wasted to support a feature that is not ever used. Similarly, a level of precision of 5 can be supported by using a database type of TIMESTAMP(5). However, many dataTime instances in XML documents stored in a database system may not have this level of precision.

Unfortunately, user requirements vary. To handle this, XML date-time types are by default represented by a general all-purpose database representation that can handle a wide range of user requirements, but not necessarily all of the user requirements. As a result, either resources are wasted to support a range of options that are seldom if ever used, or user requirements for XML date-time types are not supported in some situations.

Based on the forgoing, a mechanism is needed that allows use of database date-time types as database representations of XML date-time types to be tailored to particular user needs and/or circumstances.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Function Overview

Various techniques are described herein for determining a database representation for an XML date-time type. The determination is made by a mechanism that registers XML schemas with the database system. During the registration of a given XML schema, a database server determines (1) a database representation for the XML schema and (2) mapping information. The database representation determination is a determination about what database-types should be used to represent an XML schema and/or how instances of the XML schema are stored by a database system. Determining the appropriate database representation for a given XML schema may involve, for example, determining the database types, database objects, collection types, constraints, and even the indexes that are to be used by a database system to store data for XML documents that conform to the given XML schema. The mapping information indicates the mapping between the constructs declared in the XML schema and the constructs included in the appropriate database representation.

According to an embodiment of the present invention, an XML schema may contain annotations ("date-time annotations") that describe one or more properties of a database representation of an XML date-time type. Based on the annotations, the database determines an appropriate database representation and generates mapping information mapping the declaration of the XML date-time type of the XML schema to the constructs of the database representation.

System Overview

Figure 1:
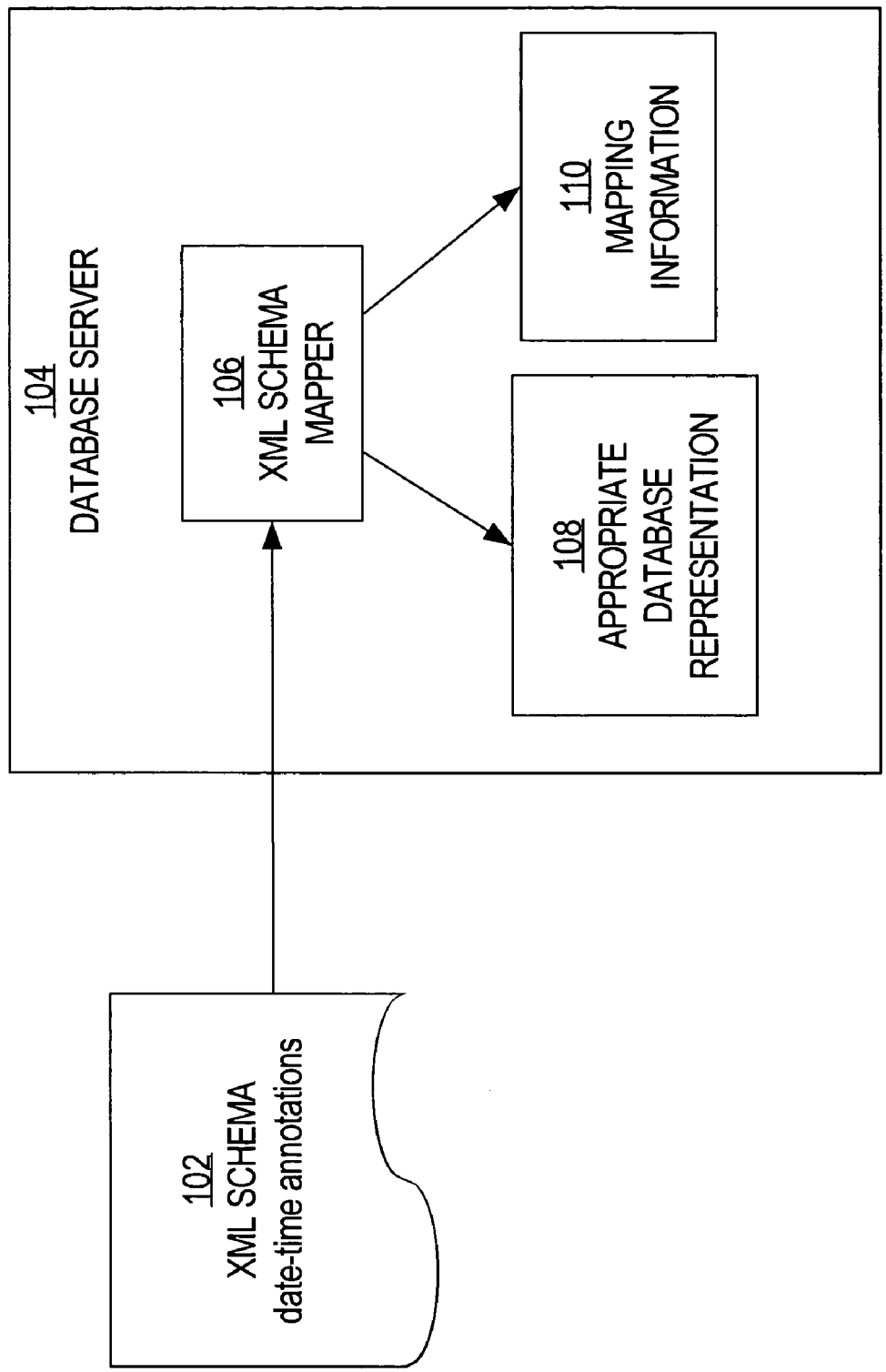
FIG. 1 is a block diagram of a storage mechanism for storing XML data according to an embodiment of the present invention.

FIG. 1 is a block diagram of a system that includes a mechanism for mapping XML schemas to object-relational database systems. The system includes a database server 104. A server, such as database server 104, is a combination of integrated software components and an allocation of computational resources, such as memory, one or more computers, and processes on the one or more computers that execute the integrated software components on a processor, the combination of the software and computational resources being dedicated to performing a particular function on behalf of one or more clients. A database server governs and facilitates access to a particular database, processing requests by clients to access the database.

Database server 104 includes an XML schema mapper 106. When an XML schema 102 is registered with database server 104, XML schema mapper 106 determines the appropriate database representation 108 for documents that conform to XML schema 102, and generates mapping information 110 that indicates the correlation between the constructs declared by the XML schema and the elements of the database representation 108.

According to an embodiment, an XML schema has to be first registered with database server 104 before it can be used or referenced within database server 104. After the registration process is completed, XML documents conforming to this schema (and referencing it via the schema URL within the document) can be stored and treated by database server 104 as instances of the XML schema.

Generation of Mapping Information

Once the appropriate database representation has been determined during registration of a particular XML schema, mapping information is generated to indicate the correlation between the parts of the database representation and the elements identified in the particular XML schema. The mapping information may indicate, for example, that data associated with a specific element of the XML schema should be stored in a particular column of a table that is generated as part of the appropriate database representation.

The mapping information enables performance benefits. For example, query performance may be improved by rewriting XPath queries to directly access the underlying columns. In addition, update performance may be improved by rewriting updates to directly update the underlying columns. Consequently, updating a portion of the XML data from a stored document would not always require rewriting the entire XML data for the stored document.

Date-Time Annotations

According to an embodiment of the present invention, date-time annotations are in the form of "annotation attributes" included in the elements of a XML schema. The attributes may belong to a namespace, such as XDB. The annotation attributes specify the database type of a database representation of an XML date-time attribute, and can specify one or more properties of the database type, such as a level of precision and with time-zone. The following declaration is provided as an illustration.

```
<element name="dob" type="dateTime"
    xdb:SQLType="TIMESTAMP(5) WITH TIME ZONE"/>
```

The preceding declaration is an element in an XML schema and defines an element of the type XML dateTime with a name of 'dob'. The annotation attribute 'xdb:SQLType' specifies a database date-time type of TIMESTAMP with a level of precision of 5 decimal places for seconds.

Illustrative Schemas

The following schemas are provided as an illustration of the use of annotations to map XML date-time types to database representations.

```
<schema xmlns="http://www.w3.org/2001/XMLSchema"
        xmlns:xdb="http://xmlns.oracle.com/xdb"
        targetNamespace="my" xmlns:my="my"
        elementFormDefault="qualified">
    <element name="Person" xdb:SQLType="PERSON_T"
                    xdb:defaultTable="PERSON_TAB">
        <complexType>
            <sequence>
                <element name="name" type="string"/>
                <element name="dob" type="dateTime"
                        xdb:SQLType="TIMESTAMP WITH
                        TIME ZONE"/>
            </sequence>
        </complexType>
    </element>
</schema>
```

When database server 104 registers the schema, database server 104 creates the object type PERSON_T with the following attributes:

| Name | Database Type |
|---|---|
| name | VARCHAR2(4000 CHAR) |
| dob | TIMESTAMP(6) WITH TIME ZONE |

Once the XML schema is registered, database server 104 can store and treat XML documents as instances of the XML schema, such as the following XML document.

```
<Person xmlns="my"
   xmlns:xsi="http://www.w3.org/2001/XMLSchema-instance"
      xsi:schemaLocation="my sch1.xsd">
   <name>foo</name>
   <dob>1973-02-12T13:44:32.342566+03:00</dob>
</Person>
```

It is not necessary to include an annotation attribute that specifies a database representation or property thereof. For example, if the annotation attribute 'xdb:SQLType' is omitted by the user in the above XML schema, database server 104 uses TIMESTAMP (without time-zone) as the default database representation, causing time zone information to be ignored.

Various XML date-time types can be mapped to TIMESTAMPS with time zones, as is illustrated by the following example:

```
<schema xmlns="http://www.w3.org/2001/XMLSchema"
      xmlns:xdb="http://xmlns.oracle.com/xdb"
      targetNamespace="my" xmlns:my="my"
      elementFormDefault="qualified">
   <element name="Root" xdb:SQLType="ROOT_T"
      xdb:defaultTable="ROOT_TAB">
```

-continued

```
      <complexType>
         <sequence>
            <element name="dt1" type="dateTime"
               xdb:SQLType="TIMESTAMP WITH TIME ZONE"/>
            <element name="t1" type="time"
               xdb:SQLType="TIMESTAMP WITH TIME ZONE"/>
            <element name="d1" type="date"
               xdb:SQLType="TIMESTAMP WITH TIME ZONE"/>
            <element name="gy1" type="gYear"
               xdb:SQLType="TIMESTAMP WITH TIME ZONE"/>
            <element name="gm1" type="gMonth"
               xdb:SQLType="TIMESTAMP WITH TIME ZONE"/>
            <element name="gd1" type="gDay"
               xdb:SQLType="TIMESTAMP WITH TIME ZONE"/>
            <element name="gym1" type="gYearMonth"
               xdb:SQLType="TIMESTAMP WITH TIME ZONE"/>
            <element name="gmd1" type="gMonthDay"
               xdb:SQLType="TIMESTAMP WITH TIME ZONE"/>
         </sequence>
      </complexType>
   </element>
</schema>
```

Once the XML schema is registered, database server 104 can store and treat XML documents as instances of the XML schema, such as the following XML document.

```
<Root xmlns="my"
   xmlns:xsi="http://www.w3.org/2001/XMLSchema-instance"
      xsi:schemaLocation="my sch2.xsd">
   <dt1>1973-02-12T13:44:32Z</dt1>
   <t1>13:44:32Z</t1>
   <d1>1973-02-12Z</d1>
   <gy1>1973-02:00</gy1>
   <gm1>--05--Z</gm1>
   <gd1>---11Z</gd1>
   <gym1>1973-02Z</gym1>
   <gmd1>--02-12Z</gmd1>
</Root>
```

Further, the precision of the database representation can be varied between multiple declarations within a XML schema, as illustrated in the following XML schema.

```
<schema xmlns="http://www.w3.org/2001/XMLSchema"
      xmlns:xdb="http://xmlns.oracle.com/xdb"
      targetNamespace="my" xmlns:my="my" elementFormDefault="qualified">
   <element name="Root5" xdb:SQLType="ROOT5_T" defaultTable="ROOT5_TAB">
      <complexType>
         <sequence>
            <element name="dt1" type="dateTime"/>
            <element name="dt2" type="dateTime" xdb:SQLType="TIMESTAMP(0)"/>
            <element name="dt3" type="dateTime" xdb:SQLType="TIMESTAMP(5)"/>
            <element name="dt4" type="dateTime" xdb:SQLType="TIMESTAMP(9)"/>
            <element name="dt5" type="dateTime" xdb:SQLType="TIMESTAMP(0) WITH TIME
               ZONE"/>
            <element name="dt6" type="dateTime" xdb:SQLType="TIMESTAMP(5) WITH TIME
               ZONE"/>
            <element name="dt7" type="dateTime" xdb:SQLType="TIMESTAMP(9) WITH TIME
               ZONE"/>
         </sequence>
      </complexType>
   </element>
</schema>
```

Once the XML schema is registered, database server 104 can store and treat XML documents as instances of the XML schema, such as the following XML document.

```
<Root5 xmlns="my"
  xmlns:xsi="http://www.w3.org/2001/XMLSchema-instance"
       xsi:schemaLocation="my sch5.xsd">
  <dt1>1973-02-12T13:44:32.666666666</dt1>
  <dt2>1973-02-12T13:44:32</dt2>
  <dt3>1973-02-12T13:44:32.666666666</dt3>
  <dt4>1973-02-12T13:44:32.666666666</dt4>
  <dt5>1973-02-12T13:44:32.6+04:00</dt5>
  <dt6>1973-02-12T13:44:32.666666666+04:00</dt6>
  <dt7>1973-02-12T13:44:32.666666666+04:00</dt7>
</Root5>
```

Hardware Overview

Figure 2:
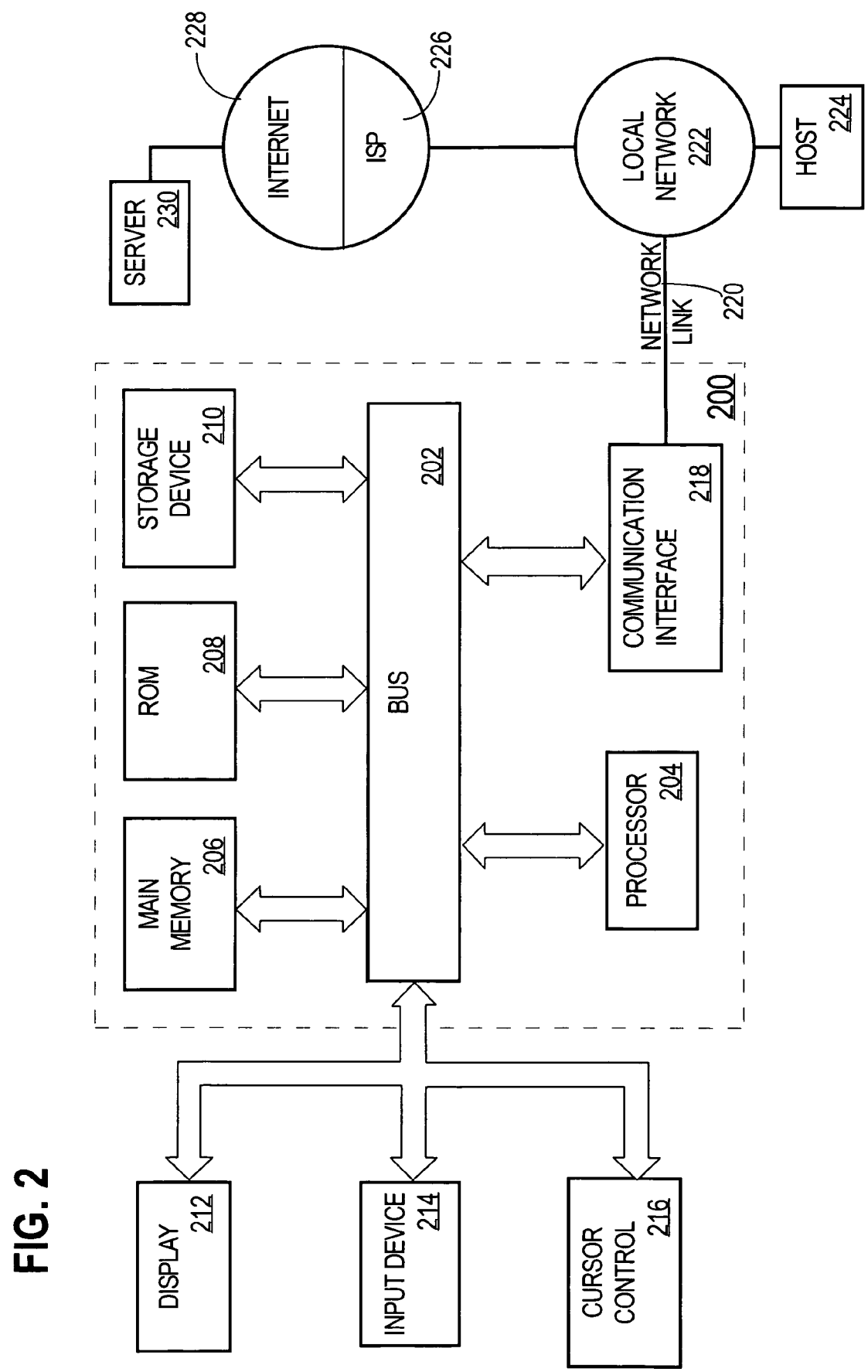
FIG. 2 is a block diagram of a computer system according to an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone-line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing XML data in a database system, comprising the steps of:
   a database server receiving a XML schema;
   wherein said XML schema includes:
      a certain declaration of a XML date-time type, and
      a certain annotation associated with said certain declaration, said certain annotation specifying an aspect of a database representation of said XML date-time type;
   based on the XML schema, said database server determining a database representation for storing, within said database system, documents that conform to an XML schema;
   wherein said database server determining a database representation includes said database server determining, based on the certain annotation, a certain database representation for said declaration of said XML date-time type; and
   said database server generating mapping data that indicates correlations between said declaration of the XML date-time type and said certain database representation.

2. The method of claim 1, wherein said certain annotation specifies a database date-time type to use as said database representation.

3. The method of claim 2, wherein said certain annotation specifies one of the following SQL datatypes:
   TIMESTAMP;
   TIMESTAMP WITH TIME ZONE; and
   DATA.

4. The method of claim 2, wherein said certain annotation specifies a level of precision for time.

5. The method of claim 2, wherein said certain annotation specifies a database date-time type that has a property that indicates time zone.

6. The method of claim 2, wherein:
   the XML schema includes a second declaration of an XML date-time type;
   wherein the second declaration does not include a date-time annotation; and
   the steps further include generating a default mapping that indicates a correlation between said second declaration and another database representation.

7. The method of claim 1, wherein:
   the XML schema includes a second declaration of an XML date-time type;
   said second declaration includes a second annotation defining the certain database date-time type as a database representation for said second declaration;
   the certain annotation and the second annotation defining a property of said database date-time type; and
   the certain annotation and the second annotation defining a different value for said property.

8. The method of claim 1, wherein:
   said certain declaration is an element within said XML schema; and
   said certain annotation is an attribute of an XML schema belonging to a particular namespace.

9. The method of claim 1, wherein the step of said database server determining a database representation and generating mapping data are performed as part of an XML schema registration operation that causes modifications within said database system.

10. The method of claim 1, further comprising the steps of:
    the database server creating structures within a database based on said database representation; and
    the database server storing in said structures data from XML documents that conform to said XML schema.

11. A computer-readable storage medium, the computer-readable storage medium storing instructions for managing XML data within a database system which, when processed by one or more processors, causes the one or more processors to perform the following steps, comprising:
    a database server receiving a XML schema;
    wherein said XML schema includes:
       a certain declaration of a XML date-time type, and
       a certain annotation associated with said certain declaration, said certain annotation specifying an aspect of a database representation of said XML date-time type;
    based on the XML schema, said database server determining a database representation for storing, within said database system, documents that conform to an XML schema;
    wherein said database server determining a database representation includes said database server determining, based on the certain annotation, a certain database representation for said declaration of said XML date-time type; and
    said database server generating mapping data that indicates correlations between said declaration of the XML date-time type and said certain database representation.

12. The storage medium of claim 11, wherein said certain annotation specifies a database date-time type to use as said database representation.

13. The storage medium of claim 12, wherein said certain annotation specifies one of the following SQL datatypes:
    TIMESTAMP;
    TIMESTAMP WITH TIME ZONE; and
    DATA.

14. The storage medium of claim 12, wherein said certain annotation specifies a level of precision for time.

15. The storage medium of claim 12, wherein said certain annotation specifies a database date-time type that has a property that indicates time zone.

16. The storage medium of claim 12, wherein:
    the XML schema includes a second declaration of an XML date-time type;
    wherein the second declaration does not include a date-time annotation; and the steps further include generating a default mapping that indicates a correlation between said second declaration and another database representation.

17. The storage medium of claim 11, wherein:
the XML schema includes a second declaration of an XML date-time type;
said second declaration includes a second annotation defining the certain database date-time type as a database representation for said second declaration;
the certain annotation and the second annotation defining a property of said database date-time type; and
the certain annotation and the second annotation defining a different value for said property.

18. The storage medium of claim 11, wherein:
said certain declaration is an element within said XML schema; and
said certain annotation is an attribute of an XML schema belonging to a particular namespace.

19. The storage medium of claim 11, wherein the step of said database server determining a database representation and generating mapping data are performed as part of an XML schema registration operation that causes modifications within said database system.

20. The storage medium of claim 11, the steps further comprising:
the database server creating structures within a database based on said database representation; and
the database server storing in said structures data from XML documents that conform to said XML schema.

* * * * *

UNITED STATES PATENT AND TRADEMARK OFFICE
CERTIFICATE OF CORRECTION

PATENT NO. : 7,406,478 B2 Page 1 of 1
APPLICATION NO. : 11/202463
DATED : July 29, 2008
INVENTOR(S) : Agrawal et al.

It is certified that error appears in the above-identified patent and that said Letters Patent is hereby corrected as shown below:

Title page item [56], on the page 2, in column 2, under "Other Publications", line 9, delete "Documnts" and insert -- Documents --, therefor.

In column 1, lines 35–36, delete "October." and insert -- October --, therefor.

In column 1, line 38, after "October" delete "28,".

In column 6, line 50, delete "T"" and insert -- T"xbd: --, therefor.

Signed and Sealed this

Twenty-second Day of December, 2009

David J. Kappos
*Director of the United States Patent and Trademark Office*